United States Patent [19]

Barlow, Jr. et al.

[11] Patent Number: 5,028,262
[45] Date of Patent: Jul. 2, 1991

[54] STABILIZATION OF INK COMPOSITIONS

[75] Inventors: Fred D. Barlow, Jr.; Kim S. Chamberlin, both of Kingsport, Tenn.

[73] Assignee: Eastman Kodak Company, Rochester, N.Y.

[21] Appl. No.: 430,452

[22] Filed: Nov. 2, 1989

[51] Int. Cl.$^5$ ............................................. C09D 11/02
[52] U.S. Cl. ...................................... 106/22; 528/293; 528/295; 528/301; 528/302; 528/304; 528/306; 522/45; 522/104
[58] Field of Search ................. 106/22; 528/293, 295, 528/301, 302, 304, 306; 522/45, 104

[56] References Cited

U.S. PATENT DOCUMENTS

| | | | |
|---|---|---|---|
| 3,734,874 | 5/1973 | Kibler et al. | 260/29.2 E |
| 3,779,993 | 12/1973 | Kibler et al. | 260/75 S |
| 4,148,779 | 4/1979 | Blackwell et al. | 260/40 R |
| 4,233,196 | 11/1980 | Sublett | 260/29.2 N |
| 4,335,220 | 6/1982 | Coney | 523/414 |
| 4,738,785 | 4/1988 | Langston et al. | 210/738 |

*Primary Examiner*—William R. Dixon, Jr.
*Assistant Examiner*—Helene Klemanski
*Attorney, Agent, or Firm*—S. E. Reiter; Thomas R. Savitsky; William P. Heath, Jr.

[57] ABSTRACT

Ink compositions which are aqueous dispersions of a water-dispersible polymer, a Disperse dye, and a dihydroxybenzophenone or derivative thereof are stable with respect to precipitation.

18 Claims, No Drawings

STABILIZATION OF INK COMPOSITIONS

BACKGROUND OF THE INVENTION

1. Field of the Invention

The present invention relates to dispersion stabilization of ink compositions with a dihydroxybenzophenone or a derivative thereof and a method for preparing stabilized ink compositions.

2. Discussion of the Background

A class of water-dispersible polymers described in U.S. Pat. No. 3,734,874, U.S. Pat. No. 3,779,993 and U.S. Pat. No. 4,233,196 (which are hereby incorporated by reference in their entirety) have found a number of commercial uses, but have mainly been employed heretofore as textile sizing materials.

These polymers are, for the most part, water dispersible because they form electrostatically stabilized colloids when mixed with water. The colloid particle size varies with the polymer composition but has been shown by light diffraction studies and transmission electron microscopy (on fresh films) to be mostly 200–800 Å in diameter. When maintained in the temperature range 0.1° C.–99.9° C., the aqueous colloid dispersions demonstrate a minimum precipitation of solid material with time. This is because the relationship between the particle densities and viscosities (very similar to those of water when concentrations are less than 30 weight percent) are such that thermal energy expressed as Brownian motion is sufficient to keep the particles suspended in water.

The fact that these polymers are not truly "dissolved" in water is readily shown by the facts that: 1) the viscosity of the dispersion is quite low and Newtonian, despite high polymer molecular weights, until relatively high concentrations (greater than 30 weight percent in water) are reached, and 2) addition of certain salts can compromise the electrostatic stability and completely precipitate the polymer from water. This second property is useful and is the basis for a process for treating ink wastes, as described in U.S. Pat. No. 4,738,785 (hereby incorporated by reference in its entirety).

It has been found that these water dispersible polymers act as film forming dispersing agents that can be used to formulate inks (see, U.S. Pat. No. 4,148,779, hereby incorporated by reference in its entirety) because they can be used to disperse significant amounts of water insoluble colorants, both dyes and pigments.

It has also been found that other water insoluble materials can be sequestered into aqueous dispersions of these polymers (see U.S. Pat. No. 4,335,220 hereby incorporated by reference in its entirety). These materials must be in the liquid state to achieve sequestering, as taught by that disclosure.

For many common printing applications, especially commercial printing using low viscosity inks such as rotogravure and flexography, the improved ink technology described in U.S. Pat. No. 4,148,779 and U.S. Pat. No. 4,335,220 gives excellent formulations with significant advantages in clean up, pollution control and worker exposure, as well as bright high-value printed products. It is possible to formulate four color inks in the substractive primary colors (yellow, magenta, and cyan), as well as black, and to print using color-separated originals and, with existing machinery run by those skilled in the art, to achieve excellent four color printed products. Also using that technology, it is possible to create inks with colorant blends and/or to blend existing inks to give specific colored inks—for example, to achieve an ink color associated with a particular product's trade dress and to have those inks give the same desirable results already described.

However, the problem with all low viscosity inks is that the colorant materials will rapidly precipitate from the ink. This is not a new problem. Machinery designed to print with low viscosity inks include stirred ink storage tanks and elaborate ink pumping systems to circulate ink and to prevent settling of the colorants. Even these measures are not always successful and the resulting colorant "sludge" is another disposal problem from most such commercial printing operations. The energy expended and extra mechanical complexity would not be needed if inks were available that were essentially free from colorant precipitation. Moreover, there are other markets (inks for low viscosity writing instruments, inks for computer run plotters, inks for continuous and drop-on-demand ink jet machines, etc) where aqueous inks would be preferred and where precipitation of the colorant cannot be prevented mechanically and cannot be tolerated in practice.

Thus, there remains a need for aqueous ink compositions from which the water-insoluble colorant material does not rapidly precipitate.

SUMMARY OF THE INVENTION

Accordingly, it is an object of the present invention to provide aqueous ink compositions from which the colorant material does not rapidly precipitate.

It is further an object of the present invention to provide aqueous ink compositions which can be used on simple machinery which does not include means to prevent settling of the water-insoluble colorant.

These and other objects of the present invention as will hereinafter become more readily apparent have been accomplished by recognizing that ink compositions, which comprise (A) a water dispersible polymer, (B) a disperse dye, (C) a dihydroxybenzophenone or a derivative thereof, and (D) water, are unexpectedly stable with respect to precipitation of the colorant.

DESCRIPTION OF THE PREFERRED EMBODIMENTS

The present invention provides ink compositions which achieve the desired low precipitation property—defined herein as a minimum of six months storage within a temperature range of 0.1° to 50° C. without any agitation such that no colored precipitate can be detected visually or by filtration with a coarse glass fritted disk. The present inks are also stable in the temperature range from 50° to 99.9° C., but the thermal energy present in that temperature range clearly works to discourage precipitation and thus stability at this temperature is not as meaningful. Moreover, the subject inks are also suitable for storage at temperatures below 0° C. At these temperatures, the water in the ink will freeze and nothing will precipitate, but on thawing (unlike the results from other aqueous ink systems) both the polymer and colorants will remain dispersed. Thus, the range 0.1° to 50° C. defines the storage range where inks are conveniently stored, and where precipitation of conventional inks is most likely to occur.

The present invention may utilize water dispersible polymers as described in the above-mentioned patents. Thus, suitable polymers "(A)" include:

Water-dispersible polymers having carbonyloxy linking groups, in the linear molecular structure wherein up to 80% of the linking groups are carbonylamido linking groups, the polymer having an inherent viscosity of at least about 0.1 measured by a 60/40 parts by weight solution of phenol/tetrachloroethane at 25° C. and at a concentration of about 0.25 grams of polymer in 100 ml of solvent, the polymer containing substantially equimolar proportions of acid equivalents (100 mole percent) to hydroxy and amino equivalents (100 mole percent), the polymer comprising the reaction product of (i), (ii), (iii) and (iv) from the following components or ester-forming or esteramide-forming derivatives thereof:

(i) at least one difunctional dicarboxylic acid;
(ii) from about 4 to about 25 mole percent, based on the total of all acid, hydroxyl and amino equivalents being equal to 200 mole percent, of at least one difunctional sulfomonomer containing at least one sulfonate group attached to an aromatic nucleus wherein the functional groups are hydroxy, carboxy, or amino;
(iii) at least one difunctional reactant selected from a glycol or a mixture of a glycol and diamine having two —NRH groups, the glycol containing two —CH$_2$—OH groups, of which glycol - - -
  (a) at least 15 mole percent, based on the total mole percent of hydroxy or hydroxy and amino equivalents, is a poly(ethylene glycol) having the structural formula: H—(OCH$_2$—CH$_2$—)$_n$—OH, n being an integer of between 2 and about 20, or
  (b) from about 0.1 to less than about 15 mole percent based on the total mole percent of hydroxy or hydroxy and amino equivalents, is a poly(ethylene glycol) having the structural formula: H—(OCH$_2$—CH$_2$—)$_n$—OH, n being an integer of between 2 and about 500, and with the proviso that the mole percent of said poly(ethylene glycol) within said range is inversely proportional to the value of n with said range; and
(iv) from none to at least one difunctional reactant selected from the hydroxycarboxylic acid having one —CH$_2$—OH, an aminocarboxylic acid having one —NRH group, an amino-alcohol having one —CR'$_2$—OH group and one —NRH group or mixtures thereof, wherein R or R' above is a H atom or an alkyl group of 1 to 4 carbon atoms.

The present invention utilizes disperse dyes "(B)". Disperse dyes as used in this context mean water-insoluble colorants that are classified as "Disperse Dyes" by the COLOUR INDEX (Published by The Society of Dyers and Colourists (England) and the American Association of Textile Chemists and Colorists (USA). They are large, chromophore containing organic molecules that do not have water-solubilizing moieties in their structures, and are water insoluble for all practical purposes. They are dyes, as opposed to pigments, because they are used in applications such as coloration of fabrics where they are dissolved in the polymers, such as polyesters or cellulosic esters, etc., that constitute the fabric. They are often applied from aqueous dispersions where common dispersants such as lignin sulfonates, and other surface active materials are used to achieve the aqueous dispersion. In the present invention, there is no need for other dispersant materials to be used other than the water dispersible polymers (A) themselves.

Specific examples of suitable dyes contemplated for use in the practice of the present invention include e.g., C.I. Disperse Yellow 3, Disperse Yellow 85, Disperse Yellow 23, Disperse Orange 25, Disperse Red 60, Disperse Red 4, Disperse Red 78, Disperse Violet 1, Disperse Violet 27, Disperse Blue 3, Disperse Blue 14, and Disperse Blue 35. Preferred dyes include C.I. Disperse Blue 337, C.I. Disperse Red 339, C.I. Disperse Yellow 200, and C.I. Disperse Black 9.

Two or more disperse dyes may be blended in the same resin, if desired, to produce a resultant color, provided that no adverse chemical reaction occurs at the dye dissolution temperature between the dyes or the resin and the dye(s). Alternatively, two or more ink compositions, prepared in accordance with the present invention, may be blended to produce a useful material having a unique color.

The present invention requires a dihyroxybenzophenone or a derivative thereof, component "(C)". This refers to organic compounds containing this moiety, but without water solubilizing moieties such that they are essentially insoluble in water. Suitable compounds are represented by the general formula (I):

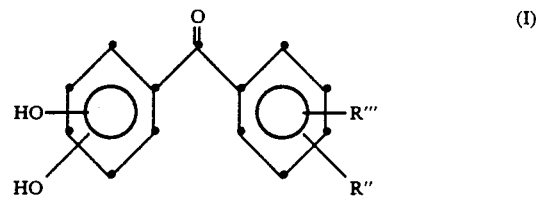

in which R'' and R''' are independently H or C$_1$ to C$_4$ alkyl, e.g., methyl, ethyl, propyl, isopropyl, cyclopropyl, butyl, isobutyl, sec-butyl, or tert-butyl. Preferred compounds are those in which one of R'' and R''' is H, and compounds in which both R'' and R''' are H are particularly preferred. It is also preferred that the two hydroxy groups be in the 2 and 4 positions. The especially preferred compound is 2,4-dihydroxybenzophenone.

The present inks may also include ink additives "(E)", used in small amounts (up to 1 percent by weight, based on the total weight of the composition) to achieve improved properties and results. These materials, which due to their low concentration clearly do not affect the teachings of this invention, may be added to achieve improved results. Additives such as biocides, viscosity modifiers, antifoamers, surface tension modifiers, adhesion promoters, slip agents, etc. are well known to those skilled in the ink formulation arts and are common articles of commerce and pressroom use. As with any ink formulation, these materials, when used, must be compatible with the formulations of these teachings.

The present invention was found when dihydroxybenzophenone compounds were added to a variety of dyed inks of various colors, in efforts to use the well known ultraviolet radiation absorbing ability of said compounds and to achieve improved reprographic performance. Surprisingly, it was discovered that the resulting formulations displayed much improved performance in that there was no detectable precipitation of the inks after storage without any agitation for six months or longer.

It was also found that other UV absorbing materials did not give this effect. For example, 4-dodecyloxy-2-hydroxybenzophenone, resorcinol monobenzoate, p-aminobenzoate, and other related structures, did not function due to lack of compatibility with the dyed inks or the polymer dispersions. See the examples hereinbelow.

Moreover, it was found that the dihydroxybenzophenone (I) compound could be included in the ink by a number of methods: 1) heating compound I with the formulation already containing the dye; 2) heating compound I and disperse dye together with the polymer dispersion; 3) as in 1) but also using an organic cosolvent that is afterwards removed by distillation; and 4) as in 2) but also using an organic co-solvent that is afterwards removed by distillation.

It has also been found that it is not necessary to use a solvent to achieve solution of the dihydroxybenzophenone in the polymer dispersion.

Subsequent storage of samples prepared in accordance with the present invention has shown very long term stability, over six months of storage with no observable precipitation or color loss.

The actual solubility of a particular dihydroxybenzophenone in the dyed ink is a function of the polymer, the other dyes used and the method of preparation. One of ordinary skill in the art can readily determine the amount of dihydroxybenzophenone to be used in the system by relatively routine experimentation, or based on previous knowledge.

Suitable amounts of components for use in the invention are 25–35 weight % of component (A), 0.5–10 weight % of component (B), and 2–10 weight % of component (C).

The preferred cases (Examples 1, 2 and 3) are described as follows:

There are three ink compositions (one for each color) that consist of:

(A) 25–30 weight percent of polymeric composition comprising one or more polymers described above with the most preferred having an inherent viscosity of from about 0.28 to about 0.38, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 44 mole % 1,4-cyclohexanedimethanol or ethylene glycol or mixtures thereof;

(B) 0.5–2.5 weight percent of Disperse Dyes with CI Disperse Blue 337, CI Disperse Red 339 and CI Disperse Yellow 200, respectively, being the most preferred;

(C) 2–5 weight percent 2,4-dihydroxybenzophenone with 4 weight percent most preferred;

(D) 55–60% water (to total 100% of the composition); and (E) up to 1% of such useful ink additives as biocides, antifoamers, and the like. Most other ink colors, including black, may be achieved by blends of the above. A "colorless" ink (Example 4), where no disperse dye (B) is used, is useful as both a colorless overprint and as a diluent to adjust the color strength of the dye-containing compositions.

The preferred method of preparation uses a volatile co-solvent, such as, for example, acetone, methylene chloride, toluene, cyclohexane, and the like; with acetone being the presently most preferred, to achieve total solution. The solvent is removed by distillation and recycled. The resultant compositions are preferably filtered to remove any foreign or undissolved solids prior to use.

The invention will now be described in greater detail by reference to the following non-limiting examples.

EXAMPLE 1

Mixture Prepared 480 grams of a mixture that was 28% (wt) of polymer (A), which was comprised of 82 mole % isophthalic acid, 18 mole % 5-sodiosulfoisophthalic acid, 54 mole % diethylene glycol and 46 mole % 1,4-cyclohexanedimethanol, 2% (wt) CI Disperse Blue 337 (B) and the rest being water (D), 20 grams 2,4-dihydroxybenzophenone (C), and 30 milliliters acetone.

The above materials were placed in a stirred 1 liter flask and heated to 93° C. slowly, distilling off the low boilers. The solution was then cooled and filtered through a medium porosity fritted glass funnel. Afterwards, 1.3 grams of 1,2-dibromo-2,4-dicyanobutane (a commercial biocide) was added.

EXAMPLE 2

Mixture Prepared 480 grams of a mixture that was 28% (wt) of the water dispersible polymer (component (A)) described in Example 1, 1% (wt) CI Disperse Red 339(B) and the rest being water, 20 grams 2,4-dihydroxybenzophenone (C), and 60 milliliters acetone.

The above materials were placed in a 1 liter stirred flask and heated slowly to 90° C. distilling off the low boilers. The solution was then cooled and filtered through a medium porosity fritted glass funnel. 1.3 Grams of 1,2-dibromo-2,4-dicyanobutane (a commercial biocide) was then added.

EXAMPLE 3

Mixture Prepared 480 grams of a mixture that was 28% (wt) of the water dispersible polymer (component (A)) described in Example 1, 1% (wt) CI Disperse Yellow 200 (B) and the rest being water (D), 20 grams 2,4-dihydroxybenzophenone (C), and 40 milliliters acetone.

The above materials were placed in a stirred flask and heated to 93° C. slowly distilling off the low boilers. The mixture was then cooled and filtered through a medium porosity fritted glass funnel. 1.3 Grams of 1,2-dibromo-2,4-dicyanobutane (a commercial biocide) was then added.

EXAMPLE 4

Mixture Prepared 5 grams 2,4-dihydroxybenzophenone (C), 95 grams of a mixture that was 28% (wt) of the water dispersible polymer (component (A)) described in Example 1, and water (D), and 20 milliliters methylene chloride.

The polymer mixture was placed in a stirred flask and the 2,4-dihydroxybenzophenone was added in methylene chloride solution. The resultant mixture was heated slowly to 90° C. distilling off the low boilers. The solution was then cooled and filtered through a medium porosity fritted glass funnel.

Stability Information

The three ink compositions which had been prepared in Examples 1–3 were checked for stability after approximately 6 months storage time. All three (yellow, red and blue) still showed excellent stability. There was no sign of solids in any of the inks and the colors were as intense as when they were first prepared. As a control, the corresponding starting polymer, dye, water mixtures (described in Examples 1-3 and with biocide but without 2,4-dihyroxybenzophenone) showed significant precipitation of the dyes within 1-2 months under identical storage conditions.

Efforts were made to achieve the same results using other UV absorbing compounds. Examples 5-7 show details of some of the efforts. All were unsuccessful.

COMPARATIVE EXAMPLE 5

Mixture Prepared 3 grams 4-dodecyloxy-2-hydroxybenzophenone (DOBP), 95 grams of a mixture of 28% (wt) of the water dispersible polymer (component (A)) described in Example 1, and water (D), and 20 milliliters methylene chloride.

The aqueous polymer was added to a stirred flask and the DOBP was added in methylene chloride. The mixture was heated slowly to 90° C., distilling off the low boilers, cooled and filtered through a medium porosity sintered glass funnel. It was impossible to obtain a UV spectrum of the filtrate because of the rapid and heavy solid precipitation.

COMPARATIVE EXAMPLE 6

Mixture Prepared 5 grams resorcinol monobenzoate (RMB), 95 grams of a mixture of 28% (wt) of the water dispersible polymer (component (A)) described in Example 1, in water (D), and 25 milliliters acetone.

The above materials were placed in a stirred flask and heated slowly to 90° C. distilling off low boilers, cooled and filtered. It was impossible to obtain a UV spectrum of the filtrate because of the rapid and heavy solid precipitation.

COMPARATIVE EXAMPLE 7

Mixture Prepared 48 grams of a mixture of 28% (wt) of the water dispersible polymer (component (A)) described in Example 1, polymer (A), 1% (wt) CI Disperse Red 339 (B) and water (D), 2 grams p-aminobenzoic acid (4%), and 10 milliliters acetone.

The above materials were placed in a stirred flask and heated slowly to 90° C., followed by cooling. Attempts to filter the material were hampered by the thickness of the resulting solution. The material solidified in the filter flask.

Determination of the Effect of 2,4-Dihydroxybenzophenone on Dyed Systems

Efforts were made to better visualize the unexpected stabilization achieved in the practice of the present invention. Examples 8 and 9 used dyes that contain heavy atoms (bromine) to give better scanning electron microscopy contrast.

EXAMPLE 8

Dispersion A 100 grams of a mixture of 25% (wt) of the water dispersible polymer (component (A)) described in Example 1, polymer (A) in water (D), and 5 grams of dye II, having the structure:

$$\text{(II)}$$

Dispersion B 100 grams of a mixture of 25% (wt) of the water dispersible polymer (component (A)) described in Example 1, in water (D), 5 grams of dye II, and 2.5 grams 2,4-dihydroxybenzophenone.

Dispersions made from each of the above mixtures were refluxed for 2 hours, and cooled to room temperature. Each was then filtered through coarse sintered glass followed by adding 0.1 grams 1,2-dibromo-2,4-dicyanobutane to each solution. By UV-VIS assay, Dispersion A contained 4.0% II and dispersion B contained 4.2% II.

Examination of fresh solid films from dispersions A and B by scanning electron photomicrograph showed that dye crystals had precipitated in solution A but that the dye remained dispersed in solution B, which contained 2,4-dihydroxybenzophenone.

EXAMPLE 9

Dispersions were prepared as in Example 8, but the dye used was III, having the structure:

$$\text{(III)}$$

Scanning electron microscope analysis of resultant fresh films showed that the dye had crystallized from the dispersion which did not contain 2,4-dihydroxybenzophenone, whereas the dye did not crystallize from the other dispersion.

The invention has been described in detail with particular reference to preferred embodiments thereof, but it will be understood that variations and modifications will be effected within the spirit and scope of the invention.

We claim:

1. An ink composition, comprising:
(A) 25 to 35 weight percent, based on the total weight of said composition, of a water-dispersible polymer having carbonyloxy linking groups, in the linear molecular structure wherein up to 80% of the linking groups are carbonylamido linking groups, the polymer having an inherent viscosity of at least about 0.1 measured in a 60/40 parts by weight solution of phenol/tetrachloroethane at 25° C. and at a concentration of about 0.25 grams of polymer in 100 ml of solvent, the polymer containing substantially equimolar proportions of acid equivalents (100 mole percent) to hydroxy and amino equivalents (100 mole percent), the polymer comprising the reaction product (i), (ii), (iii) and (iv) from the following components or ester-forming or esteramide-forming derivatives thereof:
(i) at least one difunctional dicarboxylic acid;
(ii) from about 4 to about 25 mole percent, based on the total of all acid, hydroxyl and amino equivalents being equal to 200 mole percent, of at least one difunctional sulfomonomer containing at least one sulfonate group attached to an aromatic nucleus wherein the functional groups are hydroxy, carboxy, or amino;
(iii) at least one difunctional reactant selected from a glycol or a mixture of a glycol and diamine having two —NRH groups, the glycol containing two —CH$_2$—OH groups of which glycol
(a) at least 15 mole percent, based on the total mole percent of hydroxy or hydroxy and amino equivalents, is a poly(ethylene glycol) having the structural formula:

n being an integer of between 2 and about 20, or
(b) of which glycol from about 0.1 to less than about 15 mole percent based on the total mole percent of hydroxy or hydroxy and amino equivalents, is a poly(ethylene glycol) having the structural formula:

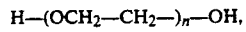

n being an integer of between 2 and about 500, and with the proviso that the mole percent of said poly(ethylene glycol) within said range is inversely proportional to the value of n with said range; and
(iv) from none to at least one difunctional reactant selected from a hydroxycarboxylic acid having one —CH$_2$—OH, an aminocarboxylic acid having one —NRH group, an amino-alcohol having one —CR'$_2$—OH group and one —NRH group or mixtures thereof, wherein R and R' above are each, independently, an H atom or an alkyl group of 1 to 4 carbon atoms;
(B) 0.5 to 10 weight percent, based on the total weight of said composition, of a water-insoluble disperse dye, selected from the set of all C. I. Disperse dyes;
(C) 2 to 10 weight percent, based on the total weight of said composition, of a dihydroxybenzophenone or a derivative thereof of the formula (I):

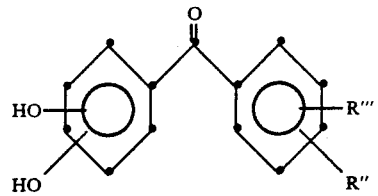

wherein R" and R'" are each, independently, H, or C$_1$ to C$_4$ alkyl; and
(D) water, as the remainder of the composition and the major substituent by weight in the composition.

2. The ink composition according to claim 1 further comprising:
(E) up to 1 weight percent, based on the total weight of said composition, of an additive selected from one group consisting of biocides, viscosity modifiers, antifoamers, surface tension modifiers, and adhesion promoters.

3. The ink composition according to claim 2, wherein said polymer (A) comprises 80-92 mole % of an isophthalic acid residue, 8-20 mole % of a 5-sodiosulfoisophthalic acid residue, 10-80 mole % of a diethylene glycol residue, 20-40 mole % of a 1,4-cyclohexanedimethanol residue, and 0-50 mole % of an ethylene glycol residue; said disperse dye (B) is selected from the group consisting of C. I. Disperse Blue 337, C. I. Disperse Red 339, C. I. Disperse Yellow 200, C. I. Disperse Black 9, and mixtures thereof; said dihydroxybenzophenone (C) is 2,4-dihydroxybenzophenone; and said additive (E) is a biocide which is 1,2-dibromo-2,4-dicyanobutane or 1,2-benzoisothiazolin-3-one present in an amount up to 0.2 wt. %.

4. The ink composition according to claim 3, wherein said dye is C. I. Disperse Blue 337.

5. The ink composition according to claim 3, wherein said dye is C. I. Disperse Red 339.

6. The ink composition according to claim 3, wherein said dye is C. I. Disperse Yellow 200.

7. The ink composition according to claim 3, wherein said dye is C. I. Disperse Black 9.

8. The ink composition according to claim 2, wherein said polymer (A) comprises 80-92 mole % of an isophthalic acid residue, 8-20 mole % of a 5-sodiosulfoisophthalic acid residue and at least about 50 mole % of a diethylene glycol residue; said disperse dye (B) is selected from the group consisting of C. I. Disperse Blue 337, C. I. Disperse Red 339, C. I. Disperse Yellow 200, C. I. Disperse Black 9, and mixtures thereof; said dihydrobenzophenone (C) is 2,4-dihydroxybenzophenone; and said additive (E) is a biocide which is 1,2-dibromo-2,4-dicyanobutane or 1,2-benzoisothiazolin-3-one present in an amount up to 0.2 wt. %.

9. The ink composition according to claim 8, wherein said dye is C. I. Disperse Blue 337.

10. The ink composition according to claim 8, wherein said dye is C. I. Disperse Red 339.

11. The ink composition according to claim 8, wherein said dye is C. I. Disperse Yellow 200.

12. The ink composition according to claim 8, wherein said dye is C. I. Disperse Black 9.

13. A method of preparing the ink composition of claim 1, wherein an aqueous dispersion of components (D), (A), and (B) is prepared; dry or water-wet solid (C) is then added to said aqueous dispersion; and the resulting mixture is heated to a temperature of at least 90° C. and then cooled and filtered.

14. The method according to claim 13, wherein an organic solvent is added to said aqueous dispersion; the organic solvent is distilled and/or azeotropically distilled away; and the resultant ink is cooled and filtered, wherein said organic solvent is compatible with the composition and has a boiling point or azeotropic boiling point below 100° C.

15. The method according to claim 14, wherein said solvent is acetone.

16. A method of preparing the ink composition of claim 1, wherein an aqueous dispersion of components (D) and (A) is prepared, (B) and (C) are added to said aqueous dispersion as dry or water-wet solids; and the resulting mixture is heated to a temperature of at least 90° C. and then cooled and filtered.

17. The method according to claim 16, wherein an organic solvent is added to said aqueous dispersion; the organic solvent is distilled and/or azeotropically distilled away; and the resultant ink is cooled and filtered, wherein said organic solvent is compatible with the composition and has a boiling point or azeotropic boiling point below 100° C.

18. The method according to claim 17, wherein said solvent is acetone.

* * * * *